(12) United States Patent
Liu et al.

(10) Patent No.: US 11,009,752 B2
(45) Date of Patent: May 18, 2021

(54) DISPLAY PANEL AND MANUFACTURING METHOD THEREOF, DISPLAY DEVICE

(71) Applicant: BOE TECHNOLOGY GROUP CO., LTD., Beijing (CN)

(72) Inventors: Liwei Liu, Beijing (CN); Yoonsung Um, Beijing (CN); Hui Zhang, Beijing (CN); Feng Liao, Beijing (CN); Kai Hou, Beijing (CN); Hongrun Wang, Beijing (CN); Shunhang Zhang, Beijing (CN); Yue Jia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/407,942

(22) Filed: May 9, 2019

(65) Prior Publication Data
US 2020/0133044 A1 Apr. 30, 2020

(30) Foreign Application Priority Data

Oct. 25, 2018 (CN) .......................... 201811250423.3

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1337* (2013.01); *G02F 1/13396* (2021.01); *G02F 1/133514* (2013.01); *G02F 1/134363* (2013.01)

(58) Field of Classification Search
CPC .......... G02F 1/13394; G02F 1/133514; G02F 1/1337; G02F 1/134363; G02F 2001/13396; G02F 1/13396; G02F 2201/50
See application file for complete search history.

(56) References Cited

U.S. PATENT DOCUMENTS 9,291,862 B2 * 3/2016 Fujiyama ............ G02F 1/13394
9,785,017 B2 * 10/2017 Lee .................... G02F 1/134309
(Continued)

FOREIGN PATENT DOCUMENTS

CN 103309091 A 9/2013
CN 10432153 A 9/2015
(Continued)

*Primary Examiner* — Hoan C Nguyen
(74) *Attorney, Agent, or Firm* — The Webb Law Firm

(57) ABSTRACT

The present disclosure relates to a display panel and a manufacturing method thereof, a display device. The display panel includes an array substrate and a color film substrate set oppositely, the array substrate includes multiple subpixel units arranged in an array and an orientation layer covering multiple subpixel units, each subpixel unit includes an opening area; the color film substrate is provided with support columns, orthographic projections of the support columns on the subpixel units are outside the opening areas, the orientation layer is formed with support protrusions which protrude from a surface of the orientation layer, orthographic projections of the support protrusions on the subpixel units are outside the opening areas, the support columns contact top ends of the support protrusions to prevent the support columns from contacting the surface of the orientation layer.

10 Claims, 5 Drawing Sheets

(51) Int. Cl.
 G02F 1/1337 (2006.01)
 G02F 1/1343 (2006.01)

(56) References Cited

U.S. PATENT DOCUMENTS

| | | | |
|---|---|---|---|
| 2012/0105759 A1* | 5/2012 | Park | G02F 1/13392 |
| | | | 349/43 |
| 2013/0235294 A1* | 9/2013 | Nomura | G02F 1/1339 |
| | | | 349/43 |
| 2014/0071391 A1* | 3/2014 | Yang | G02F 1/133345 |
| | | | 349/138 |
| 2015/0253608 A1 | 9/2015 | Cho | |
| 2016/0377900 A1 | 12/2016 | Qu | |

FOREIGN PATENT DOCUMENTS

| | | |
|---|---|---|
| CN | 107219955 A | 9/2017 |
| WO | 2018168767 A1 | 9/2018 |

* cited by examiner (a)

(b)

DISPLAY PANEL AND MANUFACTURING METHOD THEREOF, DISPLAY DEVICE

CROSS-REFERENCE TO RELATED APPLICATIONS

The present application claims priority to China Patent Application No. 201811250423.3, filed on Oct. 25, 2018, and entitled "DISPLAY PANEL AND MANUFACTURING METHOD THEREOF, DISPLAY DEVICE", the disclosure of which is incorporated by reference herein in its entirety.

TECHNICAL FIELD

The present disclosure relates to a technical field of display, specifically, to a display panel and a manufacturing method thereof, a display device.

BACKGROUND

A liquid crystal display panel has already become a main technology in a flat panel display field due to its features such as low power consumption, a relatively low manufacturing cost and no radiation, etc. The liquid crystal display panel is formed by box-alignment of a color film substrate and an array substrate, and in order to maintain a thickness of a liquid crystal box between the color film substrate and the array substrate, the color film substrate is provided with support columns. Wherein, whether a design of the support columns is reasonable directly relates to a display quality of the display panel.

SUMMARY

In a first aspect, an embodiment of the present disclosure provides a display panel including an array substrate and a color film substrate set oppositely, the array substrate includes multiple subpixel units arranged in an array and an orientation layer covering the multiple subpixel units, each subpixel unit includes an opening area; the color film substrate is provided with support columns, orthographic projections of the support columns on the subpixel units are outside the opening areas, the orientation layer is formed with support protrusions which protrude from a surface of the orientation layer, orthographic projections of the support protrusions on the subpixel units are outside the opening areas, the support columns contact top ends of the support protrusions to prevent the support columns from contacting the surface of the orientation layer.

In some embodiments, the support protrusions include first support protrusions and second support protrusions, orthographic projections of the first support protrusions and the second support protrusions on the subpixel units are respectively located at two sides of the opening areas in a first direction, the orthographic projections of the support columns on the subpixel units are located at one side of the opening areas in a second direction, the support columns contact top ends of the first support protrusions and top ends of the second support protrusions, to prevent the support columns from contacting the surface of the orientation layer; wherein, the first direction is a direction perpendicular to one of a data line and a gate line of the array substrate, the second direction is perpendicular to the first direction.

In some embodiments, both the first support protrusions and the second support protrusions have a strip shape, and extend in the second direction, a distance between the first support protrusions and the second support protrusions is a, a size of the support columns in the first direction is b, a and b satisfy: b≥2a.

In some embodiments, the support columns include main support columns and auxiliary support columns, both orthographic projections of the main support columns and the auxiliary support columns on the subpixel units are outside the opening areas, the auxiliary support columns contact the top ends of the support protrusions to prevent the support columns from contacting the surface of the orientation layer.

In some embodiments, a sum of heights of the auxiliary support columns and the support protrusions is more than a height of the main support columns.

In some embodiments, the array substrate further includes an insulation layer which covers the multiple subpixel units, protrusions are formed on the insulation layer, orthographic projections of the protrusions on the subpixel units are outside the opening areas, the orientation layer covers the insulation layer as well as the protrusions, to form the support protrusions at locations where the orientation layer covers the protrusions.

In a second aspect, an embodiment of the present disclosure provides a manufacturing method of a display panel, comprising the following steps: manufacturing an array substrate, manufacturing the array substrate including: forming multiple subpixel units arranged in an array; covering the multiple subpixel units with an orientation layer; forming support protrusions on the orientation layer, which protrude from a surface of the orientation layer; wherein, orthographic projections of the support protrusions on the subpixel units are outside the opening areas of the subpixel units; manufacturing a color film substrate, manufacturing the color film substrate including: forming support columns on one surface at one side of the color film substrate; aligning and connecting the array substrate and the color film substrate, to cause the support columns to contact top ends of the support protrusions, to prevent the support columns from contacting the surface of the orientation layer; wherein, orthographic projections of the support columns on the subpixel units are outside the opening areas.

In some embodiments, forming the support protrusions on the orientation layer, which protrude from the surface of the orientation layer, includes: forming first support protrusions and second support protrusions on the orientation layer, which protrude from the surface of the orientation layer; wherein, orthographic projections of the first support protrusions and the second support protrusions on the subpixel units are respectively located at two sides of the opening areas in a first direction, the first direction is a direction perpendicular to one of a data line and a gate line of the array substrate; aligning and connecting the array substrate and the color film substrate, to cause the support columns to contact top ends of the support protrusions, to prevent the support columns from contacting the surface of the orientation layer, includes: aligning and connecting the array substrate and the color film substrate, to cause the support columns to contact top ends of the first support protrusions and top ends of the second support protrusions, to prevent the support columns from contacting the surface of the orientation layer; wherein, the orthographic projections of the support columns on the subpixel units are located at one side of the opening areas in a second direction, the second direction is perpendicular to the first direction.

In some embodiments, covering the multiple subpixel units with the orientation layer; forming the support protrusions on the orientation layer, which protrude from the surface of the orientation layer, includes: covering the multiple subpixel units with an insulation layer; forming protrusions on the insulation layer; wherein, orthographic projections of the protrusions on the subpixel units are outside the opening areas; covering the insulation layer as well as the protrusions with the orientation layer, to form the support protrusions at locations where the orientation layer covers the protrusions.

In a third aspect, an embodiment of the present disclosure provides a display device comprising the display panel described in the first aspect.

BRIEF DESCRIPTION OF THE DRAWINGS

In order to explain embodiments of the present disclosure or technical solutions in the prior art more clearly, drawings which are needed to be used in the embodiments or the description of the prior art will be introduced briefly below. Obviously, the drawings in the following description are only some embodiments of the present disclosure. Those ordinary skilled in the art may further obtain other drawings according to these drawings, without creative labor.

DETAILED DESCRIPTION

Hereinafter, a clear and complete description of technical solutions in embodiments of the present disclosure will be given in conjunction with drawings in embodiments of the present disclosure. Obviously, described embodiments are only a part of embodiments of the present disclosure, but not all of them. Based on embodiments in the present disclosure, all other embodiments obtained by those skilled in the art without creative labor fall within the protection scope of the present disclosure.

In a description of the present disclosure, it is to be understood that, orientations or position relations indicated by terms "center", "up", "down", "orthographic", "back", "left", "right", "vertical", "horizontal", "top", "bottom", "inside", "outside", etc, are orientations or position relations shown based on the drawings, are merely for ease of describing the present disclosure and simplifying the description, but not to indicate or imply that described devices or elements must have specific orientations, be configured and operate in specific orientations, and therefore can not be understood to limit the present disclosure.

In the description of the present disclosure, it is to be noted that, unless specifically specified and limited otherwise, terms "install", "connect with", "connect" should be understood broadly, for example, it is possible to connect fixedly, it is also possible to connect detachably, or connect integrally; those ordinary skilled in the art may understand specific meanings of the above mentioned terms in the present disclosure according to specific situations.

Terms "first", "second" are only for the purpose of description, can not be understood to indicate or imply relative importance or implicitly indicate the number of indicated technical features. Thus, features defined with "first", "second" may explicitly or implicitly include one or more of the features. In the description of the present disclosure, unless stated otherwise, "multiple" means two or more than two.

Figure 1:
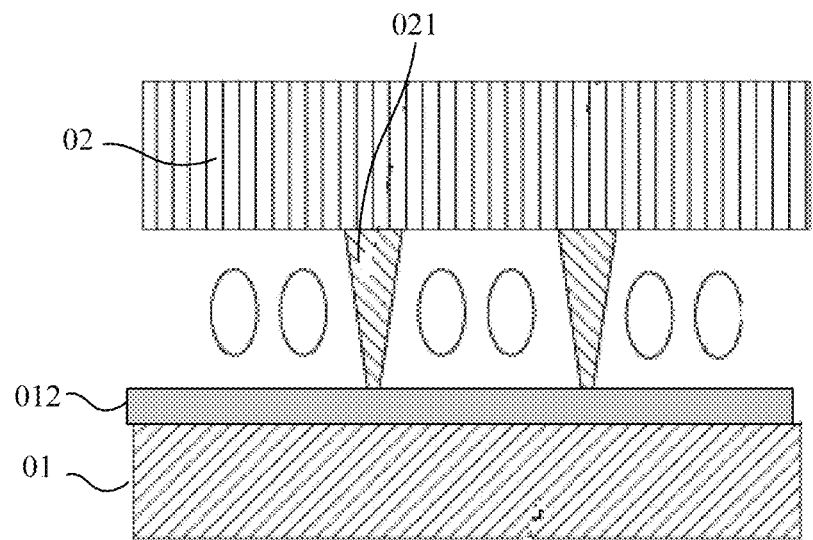
FIG. 1 is a schematic view of a structure of a display panel in the relevant art.
Figure 2:
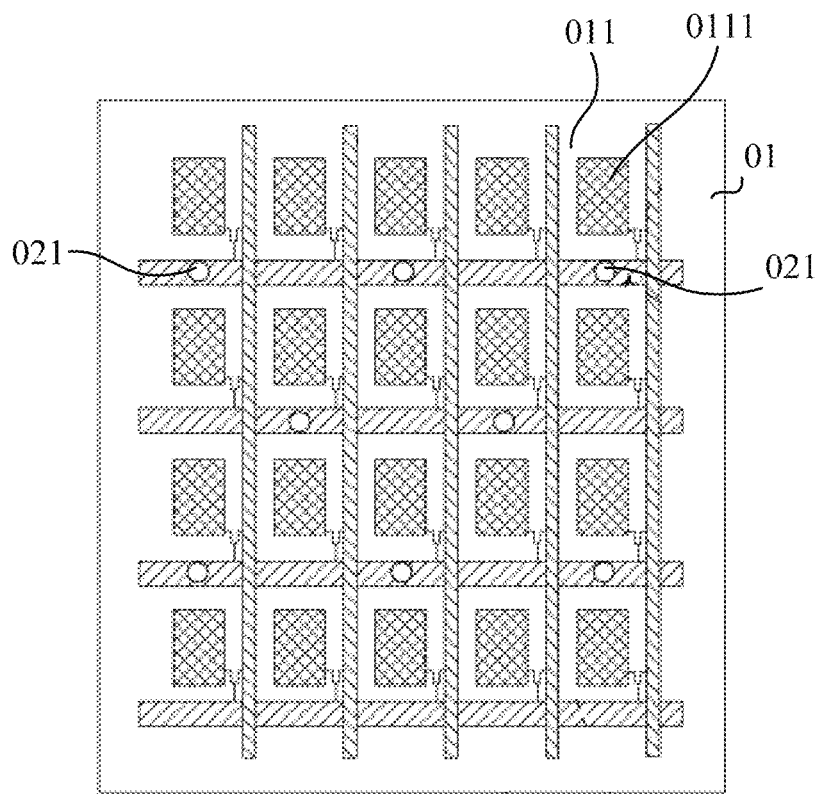
FIG. 2 is a top view of an array substrate in the display panel shown in FIG. 1.

A display panel in the relevant art, as shown in FIGS. 1 and 2, includes an array substrate 01 and a color film substrate 02 set oppositely, the array substrate 01 includes multiple subpixel units 011 arranged in an array and an orientation layer 012 covering the multiple subpixel units 011, each subpixel unit 011 includes an opening area 0111; the color film substrate 02 is provided with support columns 021, the support columns 021 contact the orientation layer 012 of the array substrate 01, and their orthographic projections on the subpixel units 011 are outside the opening areas 0111.

Such a display panel in the relevant art, in the process of production, transport, usually deforms to a certain degree under the action of external forces (e.g., vibrations, extruding forces, etc), then, the support column 021 is prone to move with deformation of the display panel, in the process of the movement, one end of the support column 021 far from the color film substrate 02 is prone to move to the opening area 0111 of the subpixel unit 011 and scratch the orientation layer 012 of the array substrate 01, so that normal orientation of liquid crystal molecules is affected, the display quality of the display panel is further affected.

Figure 3:
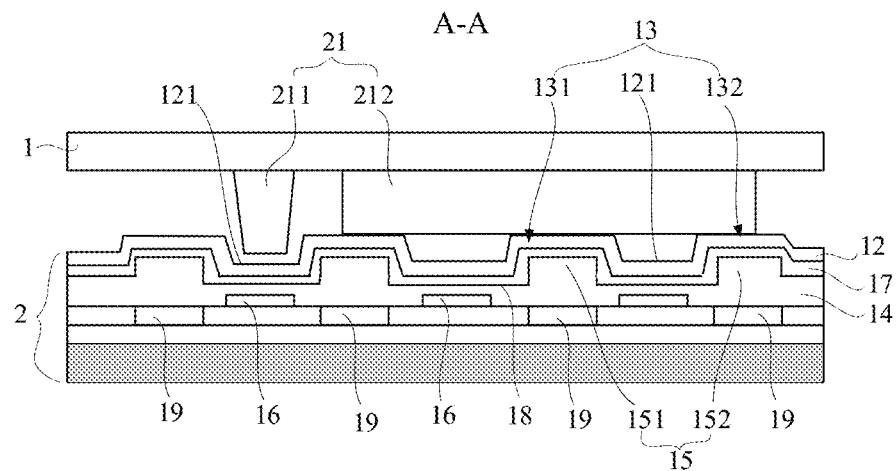
FIG. 3 is a schematic view of a structure of a display panel in an embodiment of the present disclosure.
Figure 4:
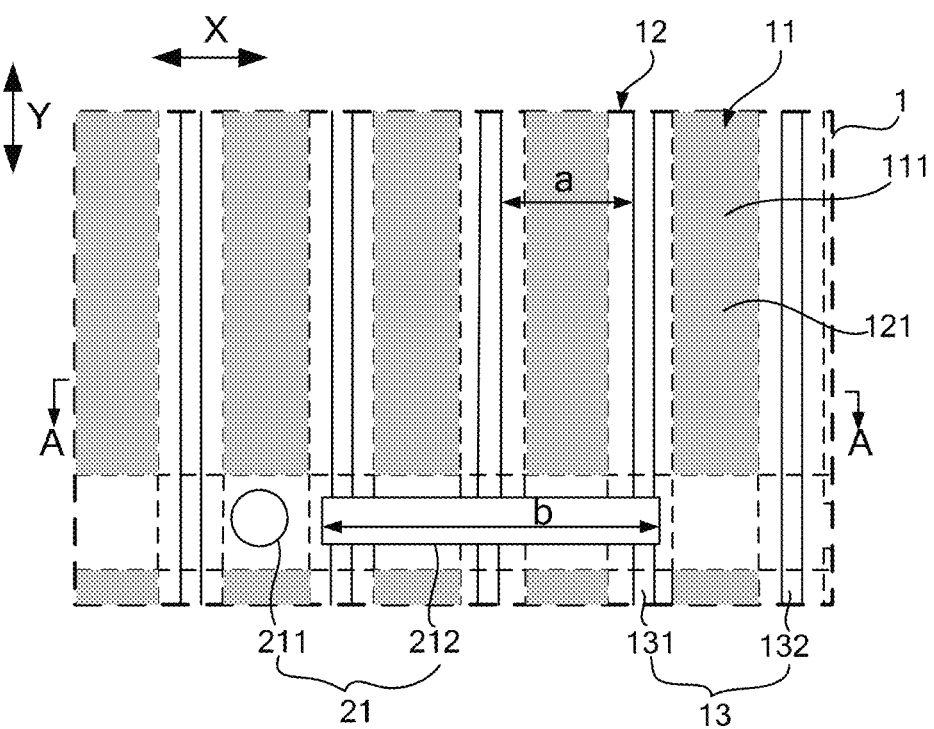
FIG. 4 is a top view of an array substrate in the display panel shown in FIG. 3.

In a first aspect, an embodiment of the present disclosure provides a display panel, as shown in FIGS. 3 and 4, the display panel includes an array substrate 1 and a color film substrate 2 set oppositely, the array substrate 1 includes multiple subpixel units 11 arranged in an array and an orientation layer 12 covering the multiple subpixel units 11, each subpixel unit 11 includes an opening area 111; the color film substrate 2 is provided with support columns 21, orthographic projections of the support columns 21 on the subpixel units 11 are outside the opening areas 111, the orientation layer 12 is formed with support protrusions 13 which protrude from a surface 121 of the orientation layer 12, orthographic projections of the support protrusions 13 on the subpixel units 11 are outside the opening areas 111, the support columns 21 contact top ends of the support protrusions 13 to prevent the support columns 21 from contacting the surface 121 of the orientation layer 12.

Wherein, a display mode of the display panel may be an IPS (In-PlaneSwitching) mode, an FFS (Fringe Field Switching) mode, a TN (Twisted Nematic) mode as well as a VA (Vertical Alignment) mode, etc, which is not limited specifically herein; the display panel may be display panels of different resolutions.

Figure 5:
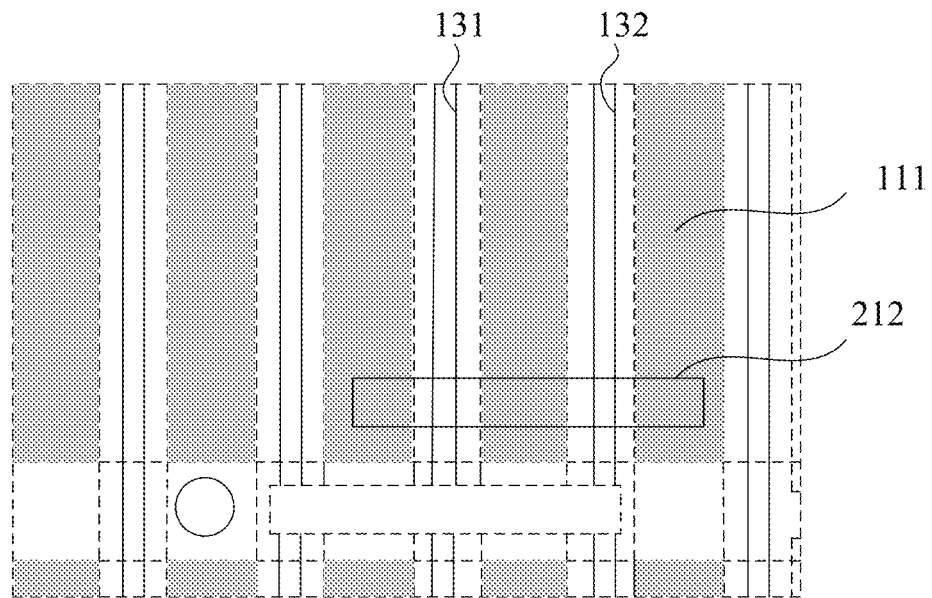
FIG. 5 is a schematic view of a support column moving when a display panel deforms in an embodiment of the present disclosure.
Figure 5:
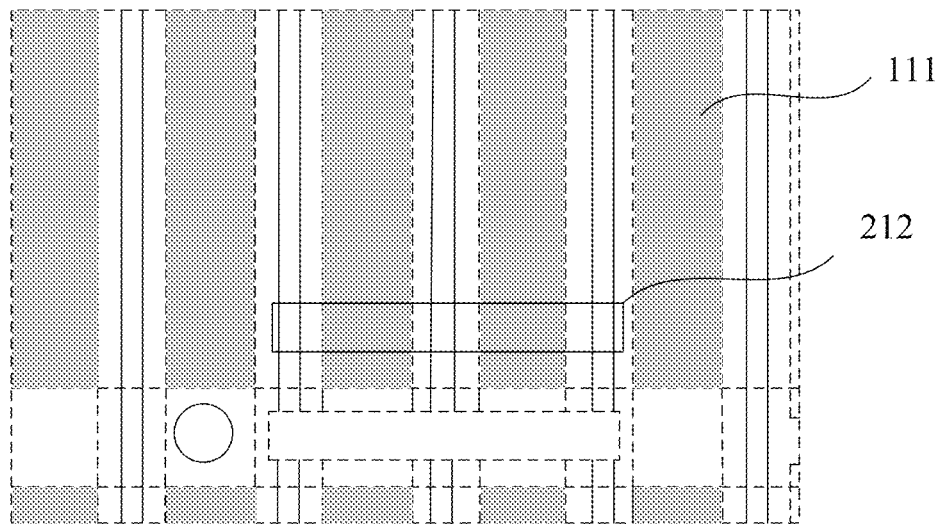

In the display panel provided by the embodiment of the present disclosure, as shown in FIGS. 3 and 4, the orientation layer 12 is formed with support protrusions 13 which protrude from the surface 121 of the orientation layer 12, orthographic projections of the support protrusions 13 on the subpixel units 11 are outside the opening areas 111, and the support columns 21 contact top ends of the support protrusions 13. (a) and (b) in FIG. 5 illustrate that a display panel deforms under the action of external forces, e.g. a case where a support column 212 moves to the opening area 111 of the subpixel unit 11. According to an embodiment of the present invention, in this case, the support column 21 will contact the top ends of the support protrusions 13, the support protrusion 13 provides fulcrums to the support column 21, so as to prevent the support column 21 from contacting the surface 121 of the orientation layer 12, so it is possible to avoid the support column 21 scratching the orientation layer 12 on the array substrate 1 which faces the opening area 111, guarantee normal orientation of liquid crystal molecules, so that it is possible to improve the display quality of the display panel.

In addition, when the display panel is in an opaque display mode, e.g. FFS mode, IPS mode, etc, when no electric field is applied, since the support column 21 will contact the top ends of the support protrusions 13, it is possible to avoid the support column 21 scratching the orientation layer 12 on the array substrate 1 which faces the opening area 111, and in this way, it is possible to avoid generation of light leak due to abnormal liquid crystal orientation, black matrixes on the color film substrate 2 do not need to be widened to shield areas which are prone to generate light leak, it is possible to not only improve an aperture ratio of the subpixel unit 11, but also guarantee that aperture ratios of respective subpixel units 11 are consistent, so that it is possible to reduce differences between the aperture ratio of the subpixel unit 11 corresponding to the support column 21 and that of other subpixel units 11, reduce a Mura risk of the support column 21.

In the above mentioned embodiment, the specific structure of the support protrusion 13 is not unique, for instance, the support protrusion 13 may have the following structure: as shown in FIGS. 3 and 4, the support protrusion 13 includes a first support protrusion 131 and a second support protrusion 132, orthographic projections of the first support protrusion 131 and the second support protrusion 132 on the subpixel unit 11 are respectively located at two sides of the opening area 111 in a first direction, a orthographic projection of the support column 21 on the subpixel unit 11 is located at one side of the opening area 111 in a second direction, the support column 21 contacts a top end of the first support protrusion 131 and a top end of the second support protrusion 132, to prevent the support columns 21 from contacting the surface 121 of the orientation layer 12;

wherein, the first direction may be a direction perpendicular to a data wire 19 of the array substrate 1, e.g. an X direction as shown in FIG. 4; it may also be a direction perpendicular to a gate line of the array substrate 1, which is not limited specifically herein; the second direction is perpendicular to the first direction, e.g. a Y direction as shown in FIG. 4; there may be an opening area 111 of one subpixel unit 11 between the first support protrusion 131 and the second support protrusion 132 (such as shown in FIG. 4), there may also be opening areas 111 of multiple subpixel units 11, which is not limited specifically herein either.

In addition, the support protrusion 13 may have the following structure: a orthographic projection of the support protrusion 13 on the subpixel unit 11 is located at one side of the opening area 111 in the first direction. In comparison with the embodiment in which the orthographic projection of the support protrusion 13 on the subpixel unit 11 is located at one side of the opening area 111 in the first direction, in the embodiment in which the support protrusion 13 includes the first support protrusion 131 and the second support protrusion 132 as shown in FIGS. 3 and 4, the first support protrusion 131 and the second support protrusion 132 provide two fulcrums to the support column 21, this may better guarantee stability of support for the support column 21, avoid the support column 21 inclining at one end in the first direction relative to the other end, so that it is possible to better prevent the support column 21 from scratching the orientation layer 12 of the array substrate 1.

In the embodiment in which the support protrusion 13 includes the first support protrusion 131 and the second support protrusion 132, heights of the first support protrusion 131 and the second support protrusion 132 may be equal, may also be not equal, and in comparison with their heights being not equal, when their heights are equal, it is possible to guarantee stability of support for the first support protrusion 131 and the second support protrusion 132 by the support column 21, so that it is possible to guarantee stability of a thickness of a liquid crystal box.

Shapes of the first support protrusion 131 and the second support protrusion 132 are not unique, as shown in FIG. 4, both the first support protrusion 131 and the second support protrusion 132 may have a strip shape, and extend in the second direction. In addition, both the first support protrusion 131 and the second support protrusion 132 may also have a lump shape, multiple first support protrusions 131 are alternately arranged in the second direction, multiple second support protrusions 132 are alternately arranged in the second direction. In comparison with both the first support protrusion 131 and the second support protrusion 132 having the lump shape, when both the first support protrusion 131 and the second support protrusion 132 have the strip shape, with respect to one subpixel unit 11, setting one first support protrusion 131 and one second support protrusion 132 may satisfy support for the support column 21, it is not necessary to set multiple first support protrusions 131 and multiple second support protrusions 132, so that it is possible to simplify a manufacture process.

In the embodiment in which both the first support protrusion 131 and the second support protrusion 132 have the strip shape, as shown in FIG. 4, a distance between the first support protrusion 131 and the second support protrusion 132 is a, a size of the support column 21 in the first direction is b. Wherein, a relation between a and b is not unique, for instance, a and b may satisfy: b≥2a; in addition, a and b may also satisfy: 2a>b≥a. In comparison with 2a>b≥a, when b≥2a, even if the support column 21 inclines in the first direction, it can also contact the first support protrusion 131 and the second support protrusion 132 simultaneously, so that it is possible to better guarantee stability of the support column 21 directly contacting the support protrusion 13, and further, it is possible to better prevent the support column 21 from scratching the orientation layer 12 of the array substrate 1.

In the embodiment in which both the first support protrusion 131 and the second support protrusion 132 have the strip shape, both the first support protrusion 131 and the second support protrusion 132 may correspond to the data lines 19 (or the gate lines) (such as shown in FIG. 3), may also not correspond to them, which is not limited specifically herein.

As shown in FIG. 3, the support column 21 includes a main support column 211 and an auxiliary support column 212, both orthographic projections of the main support column 211 and the auxiliary support column 212 on the subpixel units 11 are outside the opening areas 111.

Wherein, a setting method in which the support column 21 contacts the top ends of the support protrusions 13 is not unique, for instance, as shown in FIG. 3, the auxiliary support column 212 may contact the top ends of the support protrusions 13, to prevent the support column 21 from contacting the surface 121 of the orientation layer 12. In addition, the main support column 211 may also contact the top end of the support protrusion 13, to prevent the support column 21 from contacting the surface 121 of the orientation layer 12. Since the number of the auxiliary support columns 212 is far more than the number of the main support columns 211 in the liquid crystal display panel, therefore, in comparison with the main support column 211 contacting the top end of the support protrusion 13, the auxiliary support column 212 contacting the top ends of the support protrusions 13 may not only better guarantee that the orientation layer 12 is not scratched by the support column 21, but also provide more supporting points, so that it is possible to better guarantee stability of the thickness of a liquid crystal box.

Wherein, as shown in FIG. 3, the sum of heights of the auxiliary support column 212 and the support protrusion 13 may be more than a height of the main support column 211; in addition, the sum of heights of the auxiliary support column 212 and the support protrusion 13 may be equal to the height of the main support column 211. In comparison with the sum of heights of the auxiliary support column 212 and the support protrusion 13 being equal to the height of the main support column 211, when the sum of heights of the auxiliary support column 212 and the support protrusion 13 is more than the height of the main support column 211, it is possible to cause the main support column 211 to be far away from one end of the color film substrate 2 and not contact the surface 121 of the orientation layer 12, so that it is possible to avoid the main support column 211 scratching the orientation layer 12 in the process of movement, so that it is possible to guarantee intactness of the orientation layer 12.

A section shape of the auxiliary support column 212 is also not unique, for instance, as shown in FIG. 4, it may be a long strip shape, in addition, it may also be a circular shape. In comparison with the circular shape, when the section shape of the auxiliary support column 212 is the long strip shape, it is possible to greatly reduce space occupied by the auxiliary support column 212 in the second direction. A section shape of the main support column 211 is also not unique, for instance, it may be a long strip shape, a circular shape, etc, it may be specifically determined according to real situations; on the premise that a size of the main support column 211 in the second direction and a size of the auxiliary support column 212 in the second direction satisfy support, they should be as small as possible, for instance, they may be minimum values by which the main support column 211 and the auxiliary support column 212 can be manufactured.

In the display panel provided by the embodiment of the present disclosure, a forming method of the support protrusion 13 is also not unique, for instance, it may be formed in the following method: as shown in FIG. 3, the array substrate 1 further includes an insulation layer 14 which covers multiple subpixel units 11, protrusions 15 are formed on the insulation layer 14, orthographic projections of the protrusions 15 on the subpixel units 11 are outside the opening areas 111, the orientation layer 12 covers the insulation layer 14 as well as the protrusions 15, to form the support protrusion 13 at locations where the orientation layer 12 covers the protrusions 15. Wherein, the insulation layer 14 may be a flat layer, may also be a passivation layer, which is not limited specifically herein. In addition, it is also possible to directly form the support protrusion 13 on the orientation layer 12. The above two forming methods may be specifically determined according to real situations.

Figure 6:
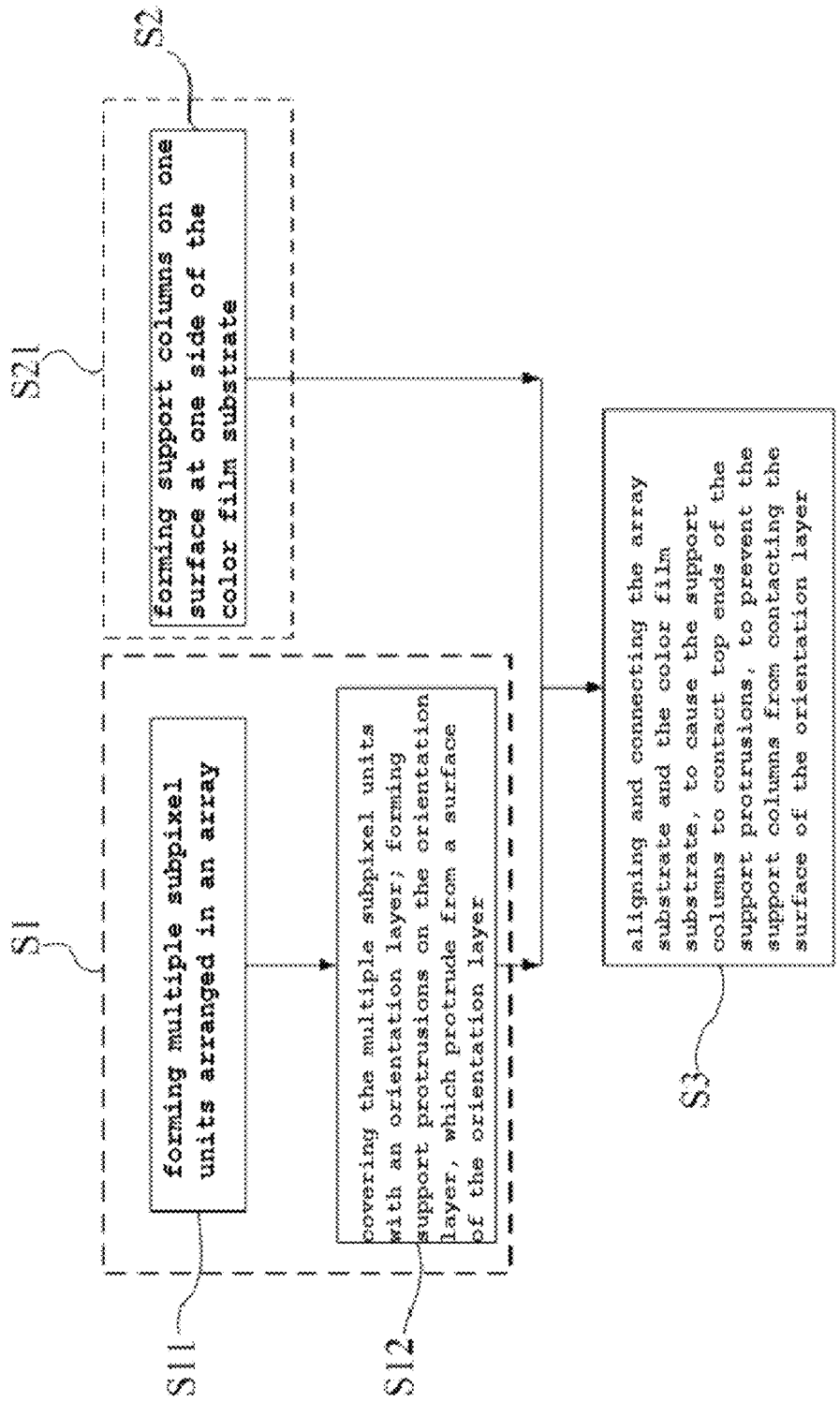
FIG. 6 is a flow chart of manufacturing of a display panel in an embodiment of the present disclosure.
Figure 7:
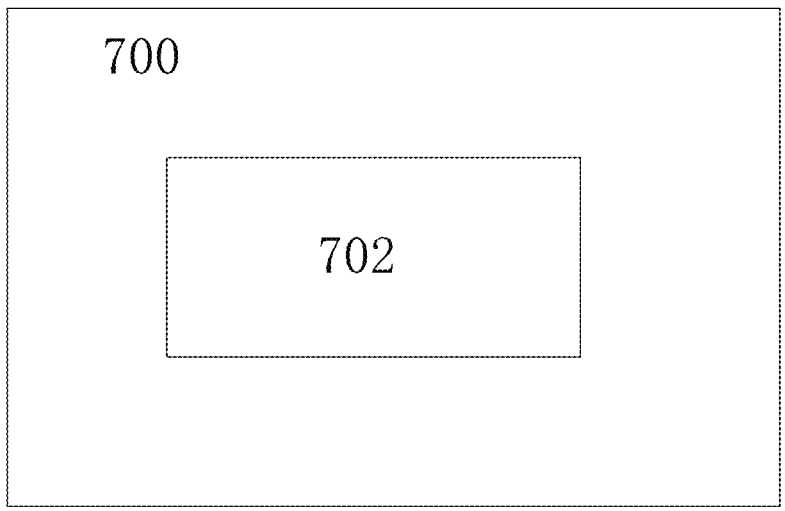
FIG. 7 is a schematic view of a structure of a display device in an embodiment of the present disclosure.

In a second aspect, an embodiment of the present disclosure provides a manufacturing method of a display panel comprising the following steps: as shown in FIG. 6, S1, manufacturing the array substrate 1: manufacturing the array substrate 1 including:

S11, forming multiple subpixel units 11 arranged in an array;

wherein, as shown in FIG. 3, step S11 may include: forming pixel electrodes 16; covering the pixel electrodes 16 with the insulation layer 14; forming a common electrode 17 on the insulation layer 14.

S12, as shown in FIG. 3, covering multiple subpixel units 11 with the orientation layer 12; forming the support protrusions 13 on the orientation layer 12, which protrude from the surface 121 of the orientation layer 12; wherein, the orthographic projections of the support protrusions 13 on the subpixel units 11 are outside the opening areas 111 of the subpixel units 11;

S2, manufacturing the color film substrate 2, manufacturing the color film substrate 2 including:

S21, as shown in FIG. 3, forming the support columns 21 on one surface at one side of the color film substrate 2;

wherein, step S21 specifically may include the following steps: forming black matrixes; covering the black matrixes with a flat layer, covering the flat layer with an orientation layer; forming the support columns 21 on the orientation layer.

S3, as shown in FIG. 3, aligning and connecting the array substrate 1 and the color film substrate 2, to cause the support columns 21 to contact the top ends of the support protrusions 13, to prevent the support columns 21 from contacting the surface 121 of the orientation layer 12; wherein, the orthographic projections of the support columns 21 on the subpixel units 11 are outside the opening areas 111.

With respect to the above mentioned step S1 and step S2, it is possible to first execute step S1, then execute step S2; it is also possible to first execute step S2, then execute step S1; it is also possible to simultaneously execute step S1 and step S2, which is not limited specifically herein.

The solved technical problem and the generated technical effect of the manufacturing method of the display panel provided by the embodiment of the present disclosure are the same as that of the display panel described in the first aspect, repeated description is no longer made herein.

In step S12, forming the support protrusions 13 on the orientation layer 12, which protrude from the surface 121 of the orientation layer 12, may include the following steps: as shown in FIG. 3, forming the first support protrusions 131 and the second support protrusions 132 on the orientation layer 12, which protrude from the surface 121 of the orientation layer 12; wherein, orthographic projections of the first support protrusions 131 and the second support protrusions 132 on the subpixel units 11 are respectively located at two sides of the opening areas 111 in a first direction, the first direction is a direction perpendicular to one of the data lines 19 and the gate lines of the array substrate 1;

In step S3, aligning and connecting the array substrate 1 and the color film substrate 2, to cause the support columns 21 to contact the top ends of the support protrusions 13, to prevent the support columns 21 from contacting the surface 121 of the orientation layer 12, may include the following steps: as shown in FIG. 3, aligning and connecting the array substrate 1 and the color film substrate 2, to cause the support columns 21 to contact both the top ends of the first support protrusions 131 and the top ends of the second support protrusions 132, to prevent the support columns 21 from contacting the surface 121 of the orientation layer 12; wherein, the orthographic projections of the support columns 21 on the subpixel units 11 are located at one side of the opening areas 111 in a second direction, the second direction is perpendicular to the first direction.

By forming the first support protrusions 131 and the second support protrusion 132 on the orientation layer 12, this may provide two fulcrums to the support columns 21, may better guarantee stability of support for the support columns 21, avoid the support columns 21 inclining at one end in the first direction relative to the other end, so that it is possible to better prevent the support columns 21 from scratching the orientation layer 12 of the array substrate 1.

in step S12, a specific method of forming the support protrusions 13 on the orientation layer 12 is not unique, for instance, it is possible to first form the protrusions 15 on the insulation layer 14 under the orientation layer 12, then cover the orientation layer 12, to form the support protrusions 13 at locations of the protrusions 15, the method specifically includes the following steps:

S121, covering multiple subpixel units 11 with the insulation layer 14; such as shown in FIG. 3, covering the pixel electrodes 16 with the insulation layer 14; wherein, the insulation layer 14 may be a flat layer.

S122, forming the protrusions 15 on the insulation layer 14;

wherein, the orthographic projections of the protrusions 15 on the subpixel units 11 are outside the opening areas 111; the protrusions 15 may be formed through a photolithographic process;

As shown in FIG. 3, in a case where the support protrusions 13 include the first support protrusions 131 and the second support protrusions 132, it is possible to form first protrusions 151 and second protrusions 152 on the insulation layer 14, specifically it is possible to adopt film forming once, exposure and development twice, a first-time exposure and development is to form the first protrusions 151 and the second protrusions 152, a second-time exposure and development is to form grooves 18 on a surface of the insulation layer 14 between the first protrusions 151 and the second protrusions 152, a part of the common electrode 17 is located inside the grooves 18; wherein, formation of the groove 18 may adopt an HTM (Half-tone MASK) technology.

S123, covering the insulation layer 14 as well as the protrusions 15 with the orientation layer 12, to form the support protrusion 13 at locations where the orientation layer 12 covers the protrusions 15.

Wherein, when the display panel is in an FFS mode, as shown in FIG. 3, the common electrode 17 is also arranged between the insulation layer 14 and the orientation layer 12.

In addition to the above mentioned method of S121~S123, it is also possible to adopt the following steps to form the support protrusion 13:

S'121, directly covering multiple subpixel units 11 with the orientation layer 12; e.g. directly covering the pixel electrodes 16 with the orientation layer 12;

S'122, forming the support protrusions 13 on the orientation layer 12;

wherein, the support protrusions 13 may be formed through a photolithographic process.

Features which appear in the embodiment of the manufacturing method of the display panel and which are the same as or similar to features in the product embodiment of the above mentioned display panel, may specifically refer to the description in the product embodiment of the above mentioned display panel, repeated description is no longer made herein.

In a third aspect, an embodiment of the present disclosure provides a display device 700 comprising a display panel 702 as described above.

Wherein, the display device 700 may be a cellphone, a tablet computer, a liquid crystal television, a computer display, etc, which is not limited specifically herein.

The solved technical problem and the generated technical effect of the display device provided by the embodiment of the present disclosure are the same as that of the display panel described in the first aspect, repeated description is no longer made herein.

Other structures in the display device are well-known to those skilled in the art, which is not limited specifically herein.

In the display panel and the manufacturing method thereof, the display device, provided in the embodiments of the present disclosure, since the orientation layer is formed with the support protrusions which protrude from the surface of the orientation layer, the orthographic projections of the support protrusions on the subpixel units are outside the opening areas, and the support columns contact the top ends of the support protrusions, in this way, when the display panel deforms under the action of external forces and the support columns move to the opening areas of the subpixel units, the support columns will contact the top ends of the support protrusions, the support protrusions provide fulcrums to the support columns, so as to prevent the support columns from contacting the surface of the orientation layer, so it is possible to avoid the support columns scratching the orientation layer on the array substrate which faces the opening areas, guarantee normal orientation of liquid crystal molecules, so that it is possible to improve the display quality of the display panel.

The above are only specific embodiments of the present disclosure, but the protection scope of the present disclosure is not limited thereto. Any changes or substitutions which may be easily conceived of by those skilled in the art within the technical scope disclosed by the present disclosure are to be covered within the protection scope of the present disclosure. Therefore, the protection scope of the present disclosure is based on the protection scope of claims.

What is claimed is:

1. A display panel comprising:
    an array substrate, the array substrate including:
        multiple subpixel units arranged in an array, each of the subpixel units including an opening area, and
        an orientation layer covering the multiple subpixel units, wherein the orientation layer comprises indentation portions and support protrusions, orthographic projections of the support protrusions on the subpixel units are outside the opening areas, the support protrusions include first support protrusions and second support protrusions, orthographic projections of the first support protrusions and the second support protrusions on the subpixel units are respectively located at two sides of the opening areas in a first direction, the first direction is a direction perpendicular to one of a data line and a gate line of the array substrate; and
    a color film substrate set oppositely to the array substrate, the color film substrate being provided with support columns, wherein the support columns include main support columns and auxiliary support columns, orthographic projections of both the main support columns and the auxiliary support columns on the subpixel units being outside the opening areas, the orthographic projections of the main support columns and the auxiliary support columns are located at one side of the opening areas in a second direction perpendicular to the first direction, wherein the main support columns are within at least some of the indentation portions, and a height of the main support column is larger than a height of the auxiliary support columns and smaller than a sum of the heights of the auxiliary support columns and the support protrusions, the auxiliary support columns contact top ends of the first support protrusions and top ends of the second support protrusions to prevent the support columns from contacting indentation portions of the orientation layer corresponding to said opening areas.

2. The display panel according to claim 1, wherein both the first support protrusions and the second support protrusions have a strip shape, and extend in the second direction, a distance between the first support protrusions and the second support protrusions is a, a size of the support columns in the first direction is b, a and b satisfy: $b \geq 2a$.

3. The display panel according to claim 1, wherein the array substrate further includes an insulation layer which covers the multiple subpixel units, protrusions are formed on the insulation layer, orthographic projections of the protrusions on the subpixel units are outside the opening areas, the orientation layer covers the insulation layer as well as the protrusions, to form the support protrusions at locations where the orientation layer covers the protrusions.

4. The display panel according to claim 1, wherein the array substrate further includes an insulation layer which covers the multiple subpixel units, protrusions are formed on the insulation layer, orthographic projections of the protrusions on the subpixel units are outside the opening areas, the orientation layer covers the insulation layer as well as the protrusions, to form the support protrusions at locations where the orientation layer covers the protrusions.

5. A manufacturing method of a display panel, comprising:

manufacturing an array substrate, manufacturing the array substrate including: forming multiple subpixel units arranged in an array; covering the multiple subpixel units with an orientation layer; wherein the orientation layer comprises indentation portions and support protrusions, orthographic projections of the support protrusions on the subpixel units are outside opening areas of the multiple subpixel units, the support protrusions include first support protrusions and second support protrusions, orthographic projections of the first support protrusions and the second support protrusions on the subpixel units are respectively located at two sides of the opening areas in a first direction, the first direction is a direction perpendicular to one of a data line and a gate line of the array substrate;

manufacturing a color film substrate, manufacturing the color film substrate including: forming support columns on one surface at one side of the color film substrate, the support columns including main support columns and auxiliary support columns, orthographic projections of both the main support columns and the auxiliary support columns on the subpixel units being outside the opening areas, the orthographic projections of the main support columns and the auxiliary support columns are located at one side of the opening areas in a second direction perpendicular to the first direction, wherein the main support columns are within at least some of the indentation portions, and a height of the main support column is larger than a height of the auxiliary support columns and smaller than a sum of heights of the auxiliary support columns and the support protrusions;

aligning and connecting the array substrate and the color film substrate, to cause the auxiliary support columns to contact top ends of the first support protrusions and top ends of the second support protrusions, to prevent the support columns from contacting indentation portions of the orientation layer corresponding to said opening areas.

6. The manufacturing method of the display panel according to claim 5, wherein manufacturing the array substrate further includes:

covering the multiple subpixel units with an insulation layer;

forming protrusions on the insulation layer; wherein, orthographic projections of the protrusions on the subpixel units are outside the opening areas; and covering the insulation layer as well as the protrusions with the orientation layer, to form the support protrusions at locations where the orientation layer covers the protrusions.

7. A display device comprising a display panel, wherein the display panel comprises:

an array substrate, the array substrate including:

multiple subpixel units arranged in an array, each of the subpixel units including an opening area, and an orientation layer covering the multiple subpixel units, wherein the orientation layer comprises indentation portions and support protrusions, orthographic projections of the support protrusions on the subpixel units are outside the opening areas, the support protrusions include first support protrusions and second support protrusions, orthographic projections of the first support protrusions and the second support protrusions on the subpixel units are respectively located at two sides of the opening areas in a first direction, the first direction is a direction perpendicular to one of a data line and a gate line of the array substrate; and a color film substrate set oppositely to the array substrate, the color film substrate being provided with support columns, wherein, the support columns include main support columns and auxiliary support columns, orthographic projections of both the main support columns and the auxiliary support columns on the subpixel units are outside the opening areas, the orthographic projections of the main support columns and the auxiliary support columns are located at one side of the opening areas in a second direction perpendicular to the first direction, wherein the main support columns are within at least some of the indentation portions, and a height of the main support column is larger than a height of the auxiliary support columns and smaller than a sum of heights of the auxiliary support columns and the support protrusions, the auxiliary support columns contact top ends of the first support protrusions and top ends of the second support protrusions to prevent the support columns from contacting indentation portions of the orientation layer corresponding to said opening areas.

8. The display panel according to claim 7, wherein both the first support protrusions and the second support protrusions have a strip shape, and extend in the second direction, a distance between the first support protrusions and the second support protrusions is a, a size of the support columns in the first direction is b, a and b satisfy: $b \geq 2a$.

9. The display panel according to claim 7, wherein the array substrate further includes an insulation layer which covers the multiple subpixel units, protrusions are formed on the insulation layer, orthographic projections of the protrusions on the subpixel units are outside the opening areas, the orientation layer covers the insulation layer as well as the protrusions, to form the support protrusions at locations where the orientation layer covers the protrusions.

10. The display panel according to claim 7, wherein the array substrate further includes an insulation layer which covers the multiple subpixel units, protrusions are formed on the insulation layer, orthographic projections of the protrusions on the subpixel units are outside the opening areas, the orientation layer covers the insulation layer as well as the protrusions, to form the support protrusions at locations where the orientation layer covers the protrusions.

* * * * *